Figure 1:
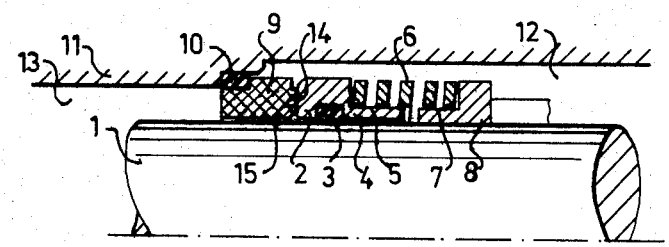

United States Patent

[11] 3,578,803

| | | |
|---|---|---|
| [72] | Inventor | Dieter Karl Wilhelm Huhn<br>Lagmansuagen 9, Vallentuna, Sweden |
| [21] | Appl. No. | 798,869 |
| [22] | Filed | Feb. 13, 1969 |
| [45] | Patented | May 18, 1971 |
| [32] | Priority | Feb. 15, 1968 |
| [33] | | Sweden |
| [31] | | 1,981/68 |

[54] SLIDE-RING SEAL
5 Claims, 2 Drawing Figs.

[52] U.S. Cl. .................................................. 277/85,
277/93
[51] Int. Cl. .................................................. F16j 15/34
[50] Field of Search .......................................... 277/93, 93
(Sd), 85, 87

[56] References Cited
UNITED STATES PATENTS
2,999,709  9/1961  Melton et al. ................. 277/93X FOREIGN PATENTS
708,400  4/1965  Canada ....................... 277/93SD

*Primary Examiner*—Laverne D. Geiger
*Assistant Examiner*—Robert I. Smith
*Attorney*—Cushman, Darby & Cushman ABSTRACT: A slide-ring seal for rotating shafts seals two spaces separated by a transverse wall. The seal comprises a seal ring rotating with the shaft and a counter-ring in the said wall. A helical spring urges the seal ring towards the counter-ring. An O-ring or sleeve seals the ring against the periphery of the shaft. The cross section of the spring wire is substantially greater in its radial direction than in its axial direction, the spring transmitting to the shaft the entire or a substantial part of the slide friction between the slide surfaces. The spring is of conical shape and exerts both axial and radial forces so as to effect sealing between the sleeve and the periphery of the shaft also.

PATENTED MAY 18 1971

3,578,803

INVENTOR.
Dieter Karl Wilhelm Huhn
BY
Cushman, Darby & Cushman
Attorneys

SLIDE-RING SEAL In slide-ring sealing the primary sealing effect is obtained between two plane surfaces sliding against each other, they being at right angles to the centerline of the shaft. These plane surfaces, of which one is stationary and secured to the machine housing or flange and the other rotates with the shaft, are kept in contact by the axial pressure of a helical spring which in certain cases simultaneously transmits the friction arising between the slide surfaces to the shaft. When the friction between the slide surfaces is transmitted by the spring, a gentle transition is effected between static and motive friction, which greatly influences the life of the seal. In known constructions this spring is made of wire having a cylindrical cross section. For the torque to be transmitted satisfactorily a very long spring with a large number of turns is normally required, thereby making it necessary for the entire sealing means to have a substantial axial length. If a shorter spring with but a few turns is used, the axial length of the seal may be reduced, in which case, however, there is a definite disadvantage in that the slide-ring seal will depend on the direction of rotation of the shaft as experience shows that the spring cannot take the forces attempting to wind it up through the friction and the direction of rotation of the shaft.

According to the present invention, the essential characteristics of which are set forth in the claims, a slide-ring seal for rotating shafts is obtained which is independent of the shaft's direction of rotation and provides a gentle transition from static to motive friction in the slide surfaces while at the same time its constructional length can be substantially reduced in relation to known constructions.

The invention will be described in further detail below with reference to the attached drawings, in which FIGS. 1 and 2 illusrate two alternative embodiments.

The sealing means is intended for sealing two spaces 12 and 13 which are separated by a transverse wall 11, through which wall a rotating shaft 1 is passed. The seal comprises a seal ring 2, sealed against the periphery of the shaft by an O-ring gasket 3, its flat surface 14 being sealed under relative motion against a similarly flat surface 15 in a sealing ring 9 which is static in the transverse wall 11. The sealing ring 9 is statically sealed against the end wall 11 by an O-ring 10. The flat slide surfaces 14 and 15 are kept in abutment by the force of a pressure spring 6 acting in the axial direction on the seal ring 2. The spring 6 is arranged between a collar 4 on the seal ring 2 and a similar collar 7 on a retaining ring 8 which is positively locked in relation to the shaft by e.g. setscrews, knobs, wedges or the like. The wire of the pressure spring 6 is not circular in cross section but rectangular, the radial extent of the section substantially exceeding its axial extent. As a result, the power exerted by the spring in the axial direction is substantially softer at the same time that the spring possesses great torsional rigidity, this being so great in relation to the friction arising between the slide surfaces that the sealing means is independent of the direction of rotation of the shaft and is simultaneously characterized by a gentle transition between static and motive friction between the seal surfaces.

The arrangement shown in FIG. 1 illustrates only one of a large number of possible embodiments of the invention. Transmission of the torque between the seal ring 2 and pressure spring 6 on the one hand and the pressure spring 6 and retaining ring 8 on the other, may take place as shown in the FIGS., the spring 6, heavily prestressed, engaging the collars 4 and 7 attached to the rings. This can be done by using a spring, the inner diameter of which when untensed is somewhat less than the external diameter of the collars 4 and 7. Other alternatives can be carried out in a known manner by allowing the pressure spring to run into a pin which is directed either radially or axially and which engages the seal ring 2 and the retaining ring 8. It is essential, however, for the entire torque to be transmitted between the seal ring 2 and retaining ring 8 via the pressure spring 6, a gentle transition between static and slide friction being effected.

Figure 2:
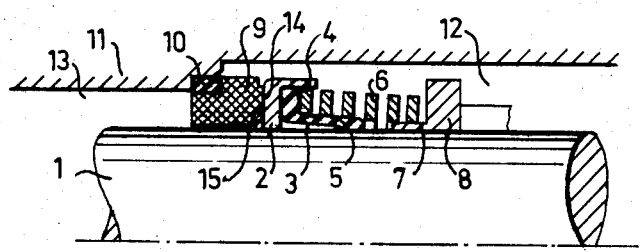

The slide ring seal shown in FIG. 2 consists of essentially the same components as that shown in FIG. 1. Here, however, a sleeve 3 is used instead of the O-ring 3 shown in FIG. 3 to effect the seal with the periphery of the shaft. With the use of such a sleeve the present invention offers the further advantage that the pressure spring 6 may be slightly conical in shape and the larger diameter of its inner cone can effect the necessary abutment pressure between the sleeve 3 and the shaft periphery for satisfactory sealing as, on axial compression of the pressure spring 6, the inner cone of the spring simultaneously exerts a force operating both radially and axially on the sleeve 3 with the conical periphery 5.

I claim:

1. A slide-ring seal for sealing two spaces separated by a transverse wall with a rotating shaft passing through an aperture in said wall, said seal comprising:

a counter-ring physically fixed and sealed about said aperture and having a flat surface radially disposed with respect to the centerline of said shaft;

a seal ring rotatable with said shaft and sealed thereto and having a mating flat surface also radially disposed with respect to the centerline of said shaft for sealing against said first-mentioned flat surface of said counter-ring; and a pressure spring wire disposed in a coil about said shaft and fixed at one end thereto for exerting an abutting axially directed sealing force between the said flat surfaces of said counter-ring and said seal ring wherein said wire has a cross-sectional shape having a radial dimension with respect to said centerline which is substantially greater than an axial dimension along said centerline thereby permitting the transfer of substantially all frictional forces between said rings through said spring wire to said shaft regardless of the direction of shaft rotation.

2. A slide-ring seal as in claim 1 further comprising:

a sealing sleeve disposed about the periphery of said shaft for sealing said seal ring to said shaft and wherein said coil of spring wire is conically shaped and disposed about at least a portion of said sleeve for exerting an inwardly directed radial force upon said sleeve as well as said axially directed force thereby sealing said sleeve against the periphery of said shaft.

3. An improved ring seal in which a first flat surface rotating with a shaft is sealed against a second physically fixed flat surface by axial force from a coiled spring wire disposed about the shaft and which wire is physically fixed at one end to said first flat surface and at the other end to said shaft, the improvement comprising;

spring wire having a substantially greater radial than axial cross-sectional dimension with respect to the centerline of said shaft thereby permitting efficient transfer of frictional forces occurring between said flat surfaces through said spring wire to said shaft irrespective of the direction of shaft rotation.

4. An improvement as in claim 3 wherein said wire has a rectangular cross-sectional shape.

5. An improvement as in claim 3 wherein said coiled spring wire is coiled in a conical shape for simultaneously exerting axial and radial forces when compressed thereby effecting radial sealing forces for se in sealing said first flat surface against said shaft as well as axial forces for use in urging said first and second flat surfaces together.